US008798166B2

(12) United States Patent
Pasqualino

(10) Patent No.: US 8,798,166 B2
(45) Date of Patent: Aug. 5, 2014

(54) VIDEO ENCODING SCHEME SUPPORTING THE TRANSPORT OF AUDIO AND AUXILIARY INFORMATION

(75) Inventor: Christopher Pasqualino, Glendora, CA (US)

(73) Assignee: Broadcom Corporation, Irvine, CA (US)

( * ) Notice: Subject to any disclaimer, the term of this patent is extended or adjusted under 35 U.S.C. 154(b) by 3859 days.

(21) Appl. No.: 10/034,414

(22) Filed: Dec. 27, 2001

(65) Prior Publication Data

US 2003/0037342 A1 Feb. 20, 2003

Related U.S. Application Data

(60) Provisional application No. 60/313,441, filed on Aug. 17, 2001, provisional application No. 60/313,610, filed on Aug. 20, 2001.

(51) Int. Cl.
*H04N 7/12* (2006.01)

(52) U.S. Cl.
USPC .................................................. 375/240.26

(58) Field of Classification Search
USPC ............... 375/240.26, 240.28, 240.16, 240.1;
348/423.1, 484, 469, 462; 370/328;
341/58
See application file for complete search history.

(56) References Cited

U.S. PATENT DOCUMENTS

| 4,348,659 | A | * | 9/1982 | Fujimori et al. | 341/58 |
| 4,771,194 | A | | 9/1988 | Van Zeghbroeck | 307/530 |
| 5,835,498 | A | | 11/1998 | Kim et al. | |
| 6,151,334 | A | | 11/2000 | Kim et al. | |
| 6,633,611 | B2 | * | 10/2003 | Sekiguchi et al. | 375/240.16 |
| 6,903,780 | B2 | * | 6/2005 | Mair et al. | 348/469 |
| 7,103,019 | B1 | * | 9/2006 | Moon | 370/328 |
| 2002/0186322 | A1 | * | 12/2002 | Mair et al. | 348/484 |

OTHER PUBLICATIONS

"Digital Visual Interface DVI", Paper Digital Display Working Group, Apr. 2, 1999, pp. 1-76, XP002948299.
Izumikawa, M. et al., "A Current Direction Sense Technique for Multiport Sram's," *IEICE Transactions On Electronics*, Institute of Electronics Information and Comm. Eng. Tokyo, JP, vol. E79-C, No. 7, Jul. 1, 1996, pp. 957-962.

* cited by examiner

*Primary Examiner* — Gims Philippe
(74) *Attorney, Agent, or Firm* — Foley & Lardner LLP; Christopher J. McKenna; Daniel E. Rose

(57) ABSTRACT

The present invention relates to a system and method for transmitting auxiliary data in video encoding. The system and method receives first and second data, encoding the first data based on a state of at least one bit of the second data. The encoded first data and the second data is packaged into a single word and communicated.

3 Claims, 6 Drawing Sheets

VIDEO ENCODING SCHEME SUPPORTING THE TRANSPORT OF AUDIO AND AUXILIARY INFORMATION

CROSS REFERENCE TO RELATED APPLICATIONS

This application is related to, and claims benefit of and priority from, Provisional Application No. 60/313,441 dated Aug. 17, 2001, titled "Video Encoding Scheme Supporting the Transport of Audio and Auxiliary Information" and Provisional Application No. 60/313,610 dated Aug. 20, 2001, titled "Video Encoding Scheme Supporting the Transport of Audio and Auxiliary Information", the complete subject matter of each of which is incorporated herein by reference in their entirety.

FEDERALLY SPONSORED RESEARCH OR DEVELOPMENT

Not Applicable

SEQUENCE LISTING

Not Applicable

BACKGROUND OF THE INVENTION

Prior video encoding schemes have incorporated functionality to minimize bit transition, and thus improve the long term DC biasing of video data streams. Commercial applications utilizing Digital Visual Interfaces (hereinafter referred to as "DVI standard") frequently make significant use of existing VESA Computer Display standards. The sequence of timing and video data for particular display resolutions and timing is specified in the VESA Computer Display Monitor Timing standard, Version 1.0, Revision 0.8 dated Sep. 17, 1998, incorporated herein by reference (hereinafter referred to as "DVI 1.0 specification"). In one such prior scheme used in DVI 1.0, the video encoder encodes video data into 10 bit words. For each word, bits 7:0 are selectively complimented, and bit 8 defines the complimenting method. The encoder considers the DC biasing of bits 8:0, and depending on a computation, bits 7:0 are inverted if inversion improves the long term DC biasing. The encoder then uses bit 9 to indicate the state of inversion, i.e., whether bits 7:0 have been inverted.

Next, the 10 bit words are communicated, and eventually received by a decoder. For each 10 bit word, the decoder considers bit 9 to determine whether the encoder has inverted bits 7:0. If bit 9 indicates that the bits 7:0 have been inverted, then the encoder performs its own inversion of bits 7:0 to recapture the original data. The overall result is a video data stream that is generally more DC balanced.

Third parties have proposed an encoding scheme that similarly encodes data into 10 bit words, but uses one of the 10 bits for audio. One problem with this proposal is that once one of the bits is used for audio, it is difficult to support prior encoding schemes, such as that discussed above, since the decoder uses all 10 bits in such schemes. In other words, this proposal does not support legacy encoding schemes.

Further limitations and disadvantages of conventional, traditional and proposed approaches will become apparent to one of skill in the art, through comparison of such systems with the present invention as set forth in the remainder of the present application with reference to the drawings.

BRIEF SUMMARY OF THE INVENTION

Aspects of the present invention may be found in a method of transmitting auxiliary data in video encoding. The method comprises receiving first data (e.g., video) and second data (e.g., audio). The first data is encoded based on the state of at least one bit of the second data. The first data and second data are then packaged into a single word, which is then communicated to a remote decoder, for example. DC balancing may be performed on the first data before it is communicated as part of the single word.

In another embodiment, the present invention related to a method of balancing a code word in a video encoder comprises receiving data, and determining a desired state of the data. The data is then encoded based on the desired state.

In one embodiment, a logic operation is selected that will result in a state which is closest to the desired state, and the logic operation is performed on at least a portion of the data.

In yet another embodiment, the present invention relates a system for transmitting auxiliary data in video encoding. The system includes un-enhanced and enhanced encoders and un-enhanced and enhanced decoders. The un-enhanced decoder is adapted to communicate with the un-enhanced and enhanced decoders, while the enhanced decoder is adapted to communicate with both the un-enhanced and enhanced decoders.

Other aspects, advantages and novel features of the present invention, as well as details of an illustrated embodiment thereof, will be more fully understood from the following description and drawings, wherein like numerals refer to like parts.

DETAILED DESCRIPTION OF THE INVENTION

Figure 1:
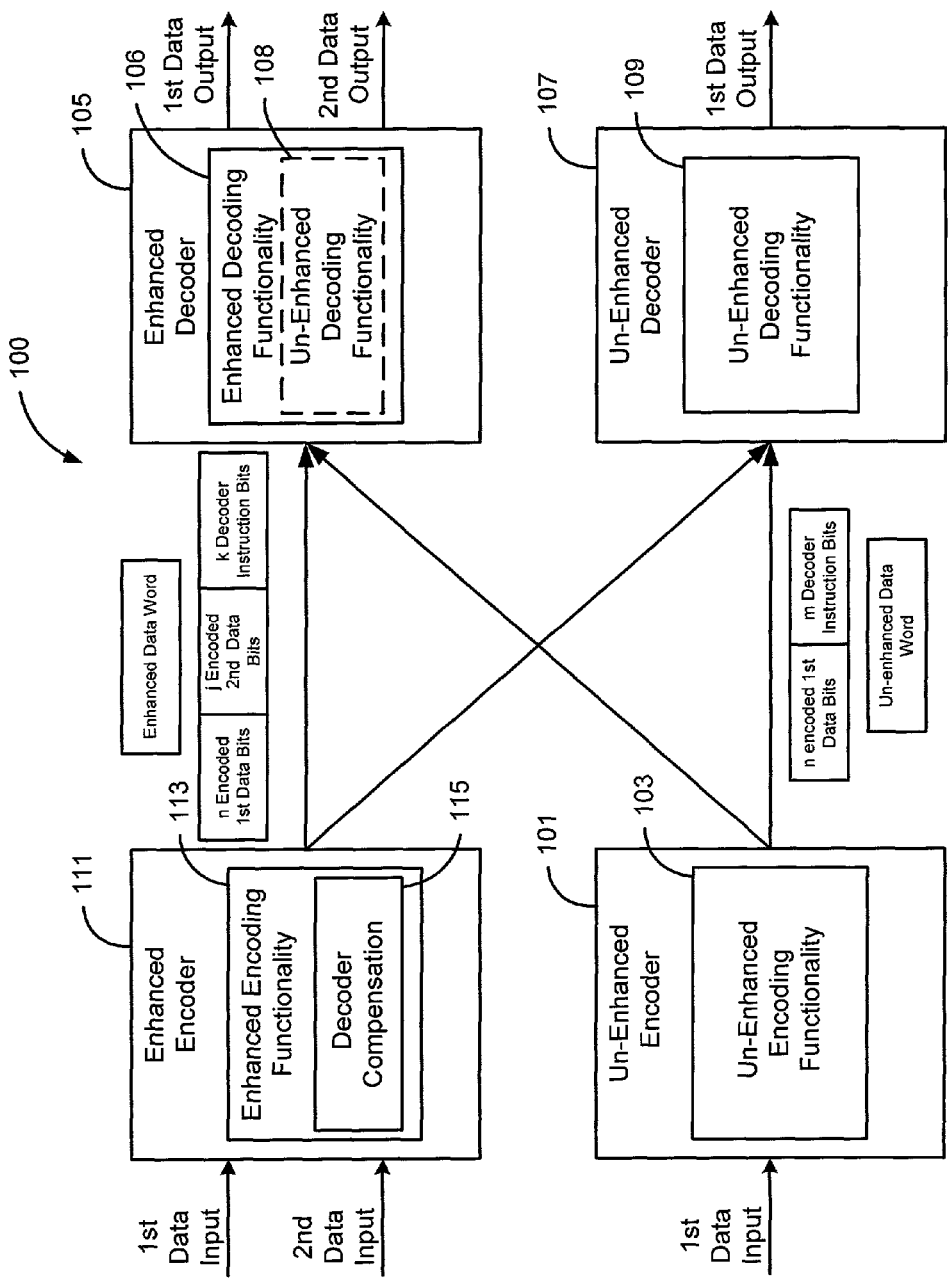
FIG. 1 illustrates a block diagram of an overall video encoding/decoding system in accordance with one embodiment of the present invention.

FIG. 1 illustrates a block diagram of an overall video encoding/decoding system 100 in accordance with one embodiment of the present invention. In this embodiment, the system 100 comprises an un-enhanced encoder 101, and enhanced encoder 111, and un-enhanced decoder 107 and an enhanced decoder 105. The un-enhanced encoder 101 receives a first data input in an un-encoded form. The un-enhanced encoder 101 applies an un-enhanced encoding functionality 103 to the first data input to generates one or more encoded first data bit(s) identified as "N" bits. The un-enhanced encoder 101 also generates one or more decoder instruction bit(s) based on the modification applied in the encoding process of the first data input and identified as "M" bits. Hereafter, the "N" data bits and "M" decoder instruction bits are packaged into a word (N+M) for delivery. Typically, such word is transmitted or delivered across a communication link such as a DVI interface to an enhanced decoder 105 or an un-enhanced decoder 107.

Upon receiving the N+M word, the un-enhanced decoder 107 uses un-enhanced decoding functionality 109 to recreate the original first data, which is then output as first data output by the un-enhanced decoder 107. In one embodiment, the decoding process involved is directed by the "M" decoder instruction bits received from the un-enhanced encoder 101.

Upon receiving the N+M word, the enhanced decoder 105 generates and recreates the first data output using the same functionality. This is accomplished by employing an un-enhanced modifier functionality 108, similar to the un-enhanced decoding functionality 109 previously described in association with the un-enhanced decoder 107. Particularly, the "M" decoder instruction bits are applied by the enhanced decoder 105, and are used by the un-enhanced decoding functionality 108 to recreate the original first data, which is then output as the first data output by the enhanced decoder 105.

In one embodiment, system 100 includes the enhanced encoder 111 which receives a first and second data input in an un-encoded form. The enhanced encoder 111 applies enhanced encoding functionality 113 to the first data input to generate one or more encoded first data bit(s), identified as "N" bits and to the second data input to generate one or more encoded second data bit(s), identified as "J" bits. In one embodiment, encoding the second input data may simply comprise passing the received second data. The enhanced encoder 111 also generates one or more decoder instruction bit(s), identified as "K" bits based on the modification applied in encoding the first and second data inputs. Hereafter, the "N" first data bits (with or without decoder compensation), "J" second data bits and "K" decoder instruction bits are packaged into a word (N+J+K) for delivery. Typically the word is delivered or transmitted across a communication link such as a DVI interface for example to the enhanced decoder 105 or the un-enhanced decoder 107.

Upon receiving the N+J+K word, the enhanced decoder 105 uses enhanced decoding functionality 106 to decode the word based on the k decoder instruction bits. The enhanced decoder 105 decodes the word into the original first and second data, which is then output as the first and second data outputs by the enhanced decoder 105.

In one embodiment the enhanced encoder 111 may perform decoder compensation 115 to support the un-enhanced decoder 107. Specifically, as provided previously, the un-enhanced decoder 107 expects to receive "N" encoded first data bits and "M" decoder instruction bits. However, in this embodiment the enhanced encoder 111 has generated "N" encoded data bit(s), "J" encoded second data bit(s), and "K" decoder instruction bit(s). The "J" second data bit(s) may be "borrowed" from what is typically the "M" decoder bits, such that J+K=M for example. In other words, at least one of what is typically a decoder instruction bit is used for second data, so that the enhanced encoder 111 generates less than "M" instruction bit(s).

In one embodiment, the enhanced encoder 111 simply communicates the encoded word N+J+K to the un-enhanced decoder 107 without any decoder compensation. In this embodiment, the un-enhanced decoder 107 simply interprets the "J" second data bit(s) as decoder instruction bit(s), and decodes the first data according to the "J" second data bit(s) and the "K" decoder instruction bit(s). If the "J" second data bit(s) match what the un-enhanced decoder 107 expects as instruction bit(s), then decoding occurs without any degradation of the first data. If the "J" second data bits do not match what the un-enhanced decoder 107 expects, some degradation of the first data may occur. An encoding scheme may be selected such that, in a majority of circumstances, end users cannot readily detect the degradation.

In another embodiment, the enhanced encoder 111 may perform decoder compensation on the first data. Specifically, for example, the enhanced encoder 111 analyzes the encoded second data bit(s) and determines whether, based on the encoding of the first data bits, the second data bit(s) match what the un-enhanced decoder 107 expects as decoder instruction bit(s). If the second data bit(s) match the expected decoder instruction bit(s), the enhanced encoder 111 simply communicates the first data bits as is to the un-enhanced decoder 107.

If the second data bit(s) and the expected decoder instruction bit(s) do not match, the enhanced encoder 111 anticipates, based on the "J" second data bits and the "K" decoder instruction bits, the result of the decoding process to be applied by the un-enhanced decoder 107 on the "N" first data bits, and modifies at least one of the "N" first data bits to counteract the result. Depending on the DC balancing desired for the first data bits, some type of decoder compensation may be employed on the first data bit(s), whether or not the second data bit(s) match what the un-enhanced decoder 107 expects as decoder instruction bits. In other words, if the second data bit(s) and the expected decoder instruction bit(s) match, a first type of compensation may be employed, and if they don't match, a second type of compensation may be employed.

Figure 2:
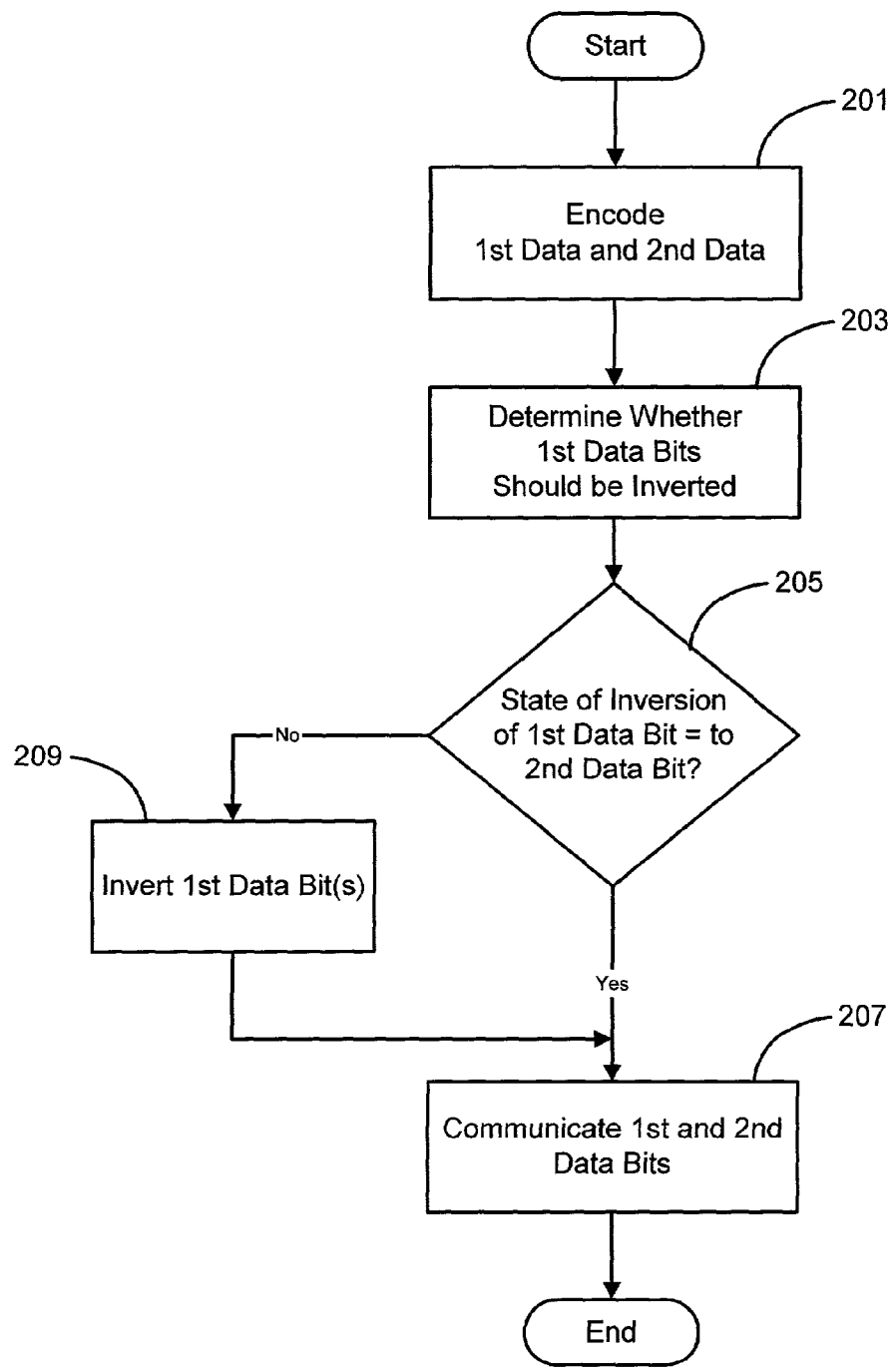
FIG. 2 illustrates a flow diagram of a decoding compensation scheme in accordance with one embodiment of the present invention.

FIG. 2 illustrates a flow diagram of a decoding compensation scheme in accordance with one embodiment of the present invention. Initially, the first and second data are encoded as illustrated by block 201. Next, the state of inversion of the first data bits resulting from the encoding process is determined as illustrated by block 203. In other words, depending on the encoding process used, the bits representing the first data are either left alone or inverted, partially to assist in DC balancing.

The state of inversion (e.g., inversion expected by a remote decoder) is compared to at least one bit of second data as illustrated by diamond 205. If the state of inversion matches the second data bit, the first data and the second data bit(s) are communicated to the remote decoder as illustrated by block 207. If the state of inversion does not match the second data bit, at least one of the first data bits is/are inverted, as illustrated by block 209, before the first data bits and second data bits are communicated to the remote decoder as illustrated by block 207.

Figure 3:
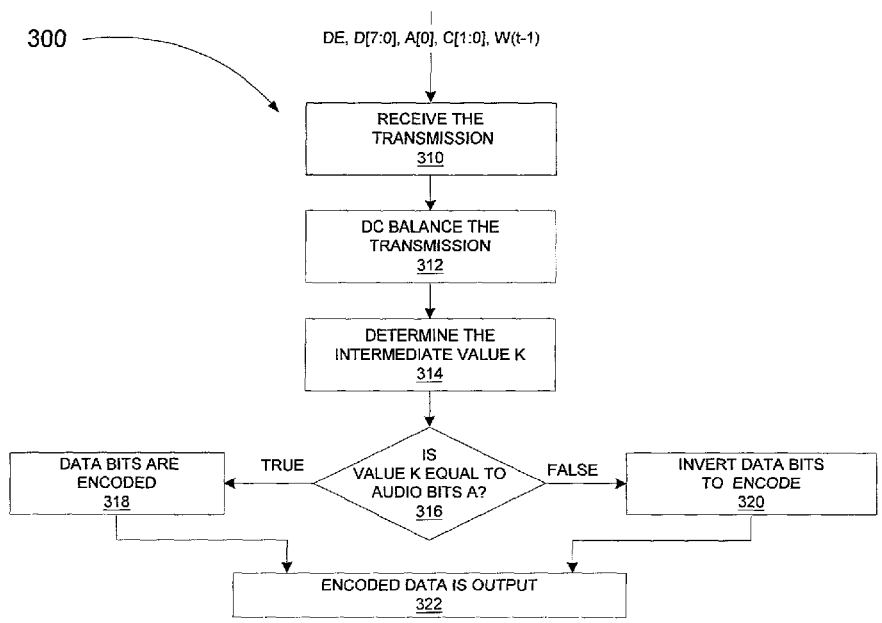
FIG. 3 illustrates a high level flow diagram of an encoding scheme with decoding compensation in accordance with one embodiment of the present invention.

FIG. 3 illustrates a high level flow diagram of an encoding scheme, generally designated 300, with decoding compensation in accordance with one embodiment of the present information. An audio stream transmission may include for example audio data, synchronization data and packet header information.

In the illustrated embodiment, the transmission is received as illustrated by block 310. The transmission is DC balanced as illustrated by block 312. An intermediate value K (i.e., a intermediate value for the K decoder instruction bit(s)) is determined as illustrated by block 314.

The scheme then determines if the intermediate value K is equal to the audio bits "a" as illustrated by diamond 316. If the intermediate value k is equal to the audio bits, "a" then the actual data bits are encoded as illustrated by block 318. The encoded data is then output as illustrated by block 322. If the intermediate value K is not equal to the audio bits A, then the actual data bits are inverted and encoded as illustrated by block 320. The encoded data is output as illustrated by block 322.

Figure 4:
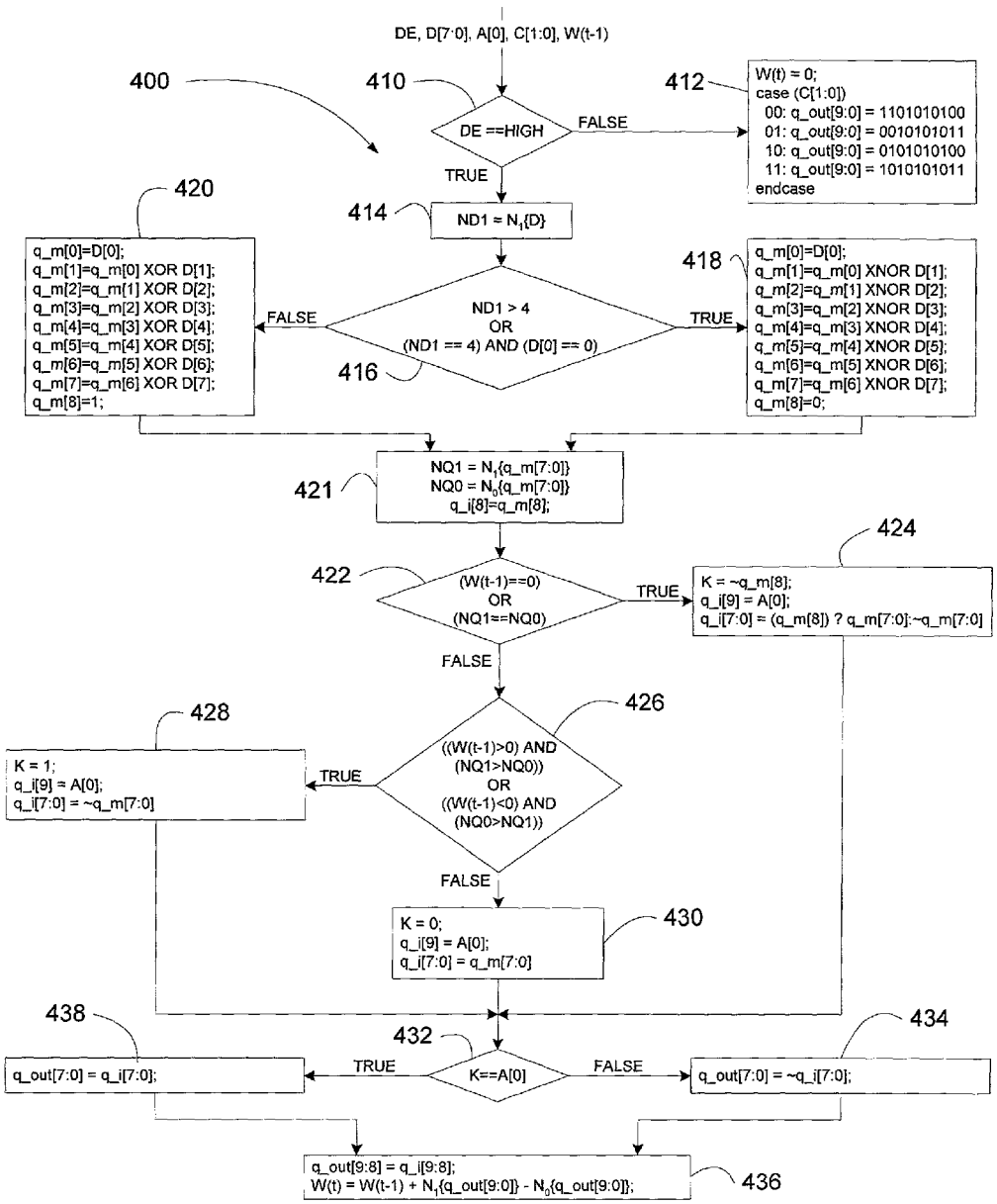
FIG. 4 illustrates a detailed flow diagram of an encoding scheme with decoding compensation similar to that of FIG. 3 in accordance with one embodiment of the present invention.

FIG. 4 illustrates one embodiment of an enhanced encoding scheme, generally designated 400, including decoding compensation in the case where a DVI encoder is used. In this embodiment, the input (i.e., second) data may be audio and/or auxiliary data. First, the audio stream(s) and auxiliary stream (s) are converted into a single serial stream. The serial stream is then broken into 3 serial streams using a 1-3 demux circuit for example. It is contemplated that, in one embodiment of the present invention, the serial streams are transmitted over a communication link having 3 channels for example, where each of the 3 serial streams is transmitted over one of the 3 channels As an example, an audio stream may be constructed with audio data, synchronization data and packet header information. In one specific embodiment of the present invention utilizing DVI (i.e., 10 bit words having 8 video [e.g., first] data bits and 2 instruction or control bits), one of the instruction bits, bit 9 for example, is replaced with a second data bit, such as an audio bit, for example, on each of the 3 DVI channels.

In the illustrated embodiment, one of the instruction bits is replaced with such a second data bit only when active video is being transmitted (i.e., when the data enable or "DE" is high or equal to 1) as illustrated by diamond 410. If DE is not equal to 1, then the sync data is being transmitted, and not active video, as illustrated by block 412.

In the illustrated embodiment, the transmission is decoded as illustrated by block 414; diamond 416 and blocks 418, 420, and 421; and diamond 422 and block 424. The decoded transmission is DC balanced as illustrated by diamond 426 and blocks 428 and 430. Such DC balancing may include determining the historical weight for the decoded transmission and adjusting such DC balancing over time if necessary.

The intermediate value K is compared with the audio bits as illustrated by diamond 442 and as provided previously. If the value K is equal to value A, the actual data bits are encoded as illustrated by block 438. The encoded data is then output as illustrated by block 436. If the intermediate value K is not equal to value A, then the actual data bits are inverted and encoded as illustrated by block 434. The encoded data is then output as illustrated by block 436.

More specifically, FIG. 4 illustrates that, if desired, synchronization words are transmitted on these bits during the first 10 video pixels, for example, following the blanking period. After the synchronization word, if used, audio header information is next transmitted. Finally, as much audio data as will fit on the line is transmitted, or at least as much as is available. The sizes of the sync word and header may be adjusted for various applications. A sync pulse may also be "notched" to indicate the presence of audio and/or other second data. Such "notch" may include a stutter at the leading edge of sync for example although other embodiments are contemplated. After the audio packet has been transmitted, bit 9 is transmitted in normal DVI fashion.

There is no impact on decoded video codeword on those symbols that have an audio bit that would match the value of bit 9. On those DVI symbols that have an audio bit that differs from the value of bit 9, the decoded codeword would have the LSB inverted. This would be undetectable by the vast majority of end users, particularly in the case of motion images. Furthermore, notching the vsync pulse has little or no effect.

Some benefits of such transmission to enhanced decoders include: (1) little or no degradation; (2) substantial throughput (e.g., 640×480@60 Hz, more than 55 Mbps raw throughput, and more than 49 Mbps throughput after the header and sync word are considered); and (3) the data is still somewhat DC balanced.

Figure 5:
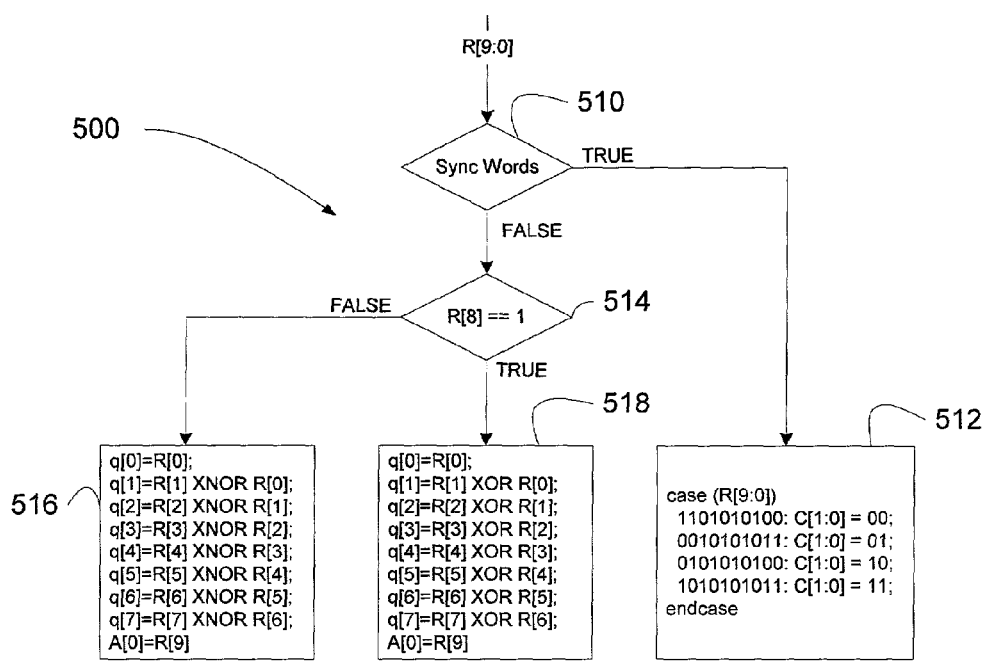
FIG. 5 illustrates a flow diagram of a decoding operation for use in connection with the encoding scheme of FIG. 4.

FIG. 5 illustrates a flow diagram of a decoding operation for use in connection with the encoding scheme of FIG. 4. In this embodiment, the decoded transmission is not DC balanced as provided previously. In FIG. 5, one of the instruction bits is replaced with a second data bit only during active video. It is determined if sync words are being transmitted as illustrated by diamond 510. If sync words, are being transmitted, and not active video, the data is not decoded as illustrated by block 512.

If however active video is being transmitted, the scheme uses logic functions to balance the word towards a stronger 0 or 1 presence. It is determined if received bit 8 is equal to 1 as illustrated by diamond 514. If the received 8 bit is not equal to 1, the received data may be logically combined using an exclusive nor function (alternatively referred to as "XNOR) as illustrated by block 516. If however, the received 8th bit is equal to 1, the received data may be logically combined using an exclusive or function (alternatively referred to as "XOR) as illustrated by block 518.

In an alternative embodiment for use in supporting un-enhanced decoders (e.g., DVI 1.0 decoders), DC balancing is not used. Specifically, a second data bit (e.g., audio) is used to set whether the encoder inverts or does not invert one or more of the first data bits (e.g., video).

Figure 6:
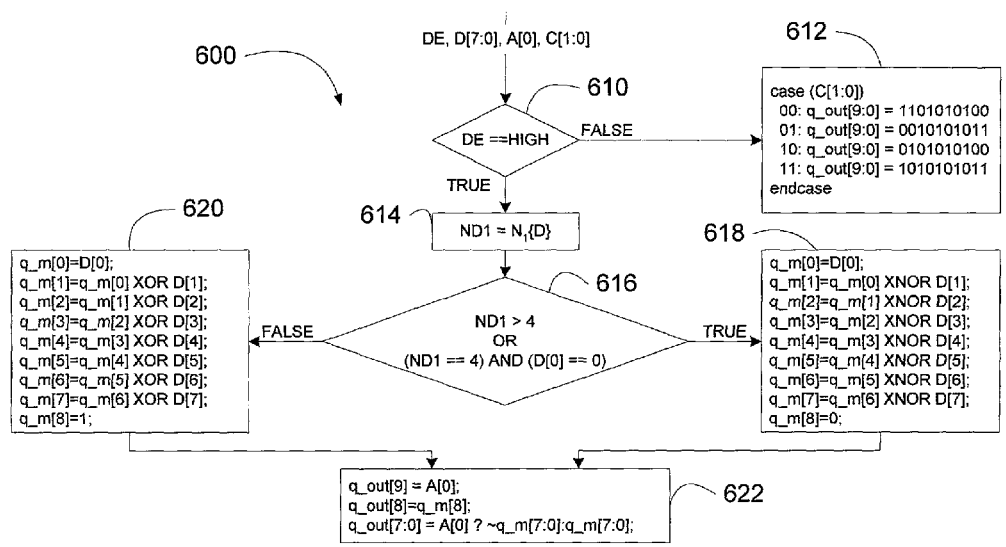
FIG. 6 is a flow diagram of an encoding scheme that produces code word containing video and other data (e.g., audio) compatible with the DVI 1.0 standard.

In this manner, the un-enhanced decoder likewise uses the second data bit as if it were a decoder instruction bit, and the decoding proceeds to recapture the original first data without degradation. FIG. 6 illustrates one example of this alternative embodiment. More particularly FIG. 6 illustrates a flow diagram of an encoding scheme, generally designated 600, that produce a DVI 1.0 compatible code word containing video and other (e.g., audio) data.

It is determined if the data is transmitted during active video (i.e., DE is high) as illustrated by diamond 610. If the DE is not high, then the data being transmitted is sync data as illustrated by block 612. If DE is high, then active video is being transmitted. The number of ones in the data is determined as illustrated by block 614.

It is determined if the number of 1's in the data is greater than 4 OR equal to 4 AND the first data bit is 0 as illustrated by diamond 616. If the number of 1's is greater than 4 OR the number of 1's is equal to 4 AND the first data bit is 0 a logical XNOR function is used to encode the data as illustrated by block 618. If however the number of 1's is less than 4 OR the number of 1's is not equal to 4 AND the first data bit is not 0 a logical XOR function is used to encode the data as illustrated by block 618. A DVI compatible word containing video and other data (audio data for example) is produced as illustrated by block 622.

In another alternative embodiment for use in supporting un-enhanced decoders (e.g., DVI 1.0 decoders), DC balancing is still used. Specifically, NRZI0 or NRZI1 encoding is used, for example, and bit 8 is set to be compatible with DVI. For example, bit 8 is set to all 0 or all 1 in each word. Bit 9 is then used for DC balancing. Second data (e.g., audio) is sent during the blanking period, for example, as described in non-provisional patent application Ser. No. 09/951,289 filed Sep. 12, 2001, and non-provisional patent application Ser. No. 09/951,671 filed Sep. 12, 2001, which applications are hereby incorporated herein by reference. The second data can be transmitted during the blanking periods also as described in other blanking period mechanisms In a variation of the embodiment above, DC balancing is not used. Specifically, bit 9 (along with bit 8) is simply set to be compatible with DVI. For example, each of bit 9 and bit 8 are set to be all 0 or all 1 in each word. Second data is then again transmitted during the blanking period, as mentioned above.

In a further embodiment of the present invention for use in supporting un-enhanced decoders (e.g., DVI 1.0 decoders), encoding is performed based on the second data (e.g., audio for example, although other data is contemplated). Specifically, second data is sent in bit 8 and NRZI0 or NRZI1 encoding, for example, is performed based on that bit, not on the numbers of 0's or 1's. DC balancing can then be performed using bit 9. This provides backward compatibility with most manufacturer's DVI 1.0 receivers, DC balancing, and the ability to transmit second data in the 10-bit word.

In one variation of the embodiment provided previously, DC balancing is not used. Specifically, both bit 9 and bit 8 are used to transmit second data, and encoding is performed based on the state of one of the second data bits (bit 8).

In still a further embodiment of the present invention for use in supporting un-enhanced decoders (e.g., DVI 1.0 decoders), a pre-balancing or intra-word DC balancing is performed. In this embodiment, bit 9 is either fixed to 0 or 1, used to transmit second data (e.g., audio), or set for traditional balancing. Bit 8 is then used to perform pre-balancing or intra-word DC balancing. Specifically, for example, if a weighting factor exists in the cumulative history towards 0, then it may be desirable to make a particular word a stronger 1 presence. This may be achieved by either using exclusive OR or exclusive NOR. Specifically, a determination is made as to which operation (exclusive OR or exclusive NOR) provides the most number of 1's. In other words, instead or choosing exclusive OR or exclusive NOR based on the number of 1's, the choice is made based on which operation will result in the most number of 1's. Of course the same procedure may be used if it is desirable to make a particular word a stronger 0 presence (i.e., will result in the most number of 0's). An alternate video encoding scheme is set out in commonly assigned Non-provisional application Ser. No. 10/034,383 dated Dec. 27, 2001, titled "Flexible Video Encoding Scheme Supporting Audio and Auxiliary Information" the complete subject matter of which is incorporated herein by reference in its entirety.

Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A system for transmitting auxiliary data in video encoding comprising:
   an un-enhanced encoder;
   an enhanced encoder;
   an un-enhanced decoder adapted to communicate with said un-enhanced and enhanced encoders; and
   an enhanced decoder adapted to communicate with said un-enhanced and enhanced encoders.

2. The system of claim 1, wherein said enhanced decoder is adapted to communicate enhanced data word.

3. The system of claim 1, wherein said un-enhanced encoder is adapted to communicate un-enhanced data word.

* * * * *